April 28, 1959     C. C. HARKLEROAD     2,883,866
POWER CONTROL MECHANISM
Filed April 10, 1957
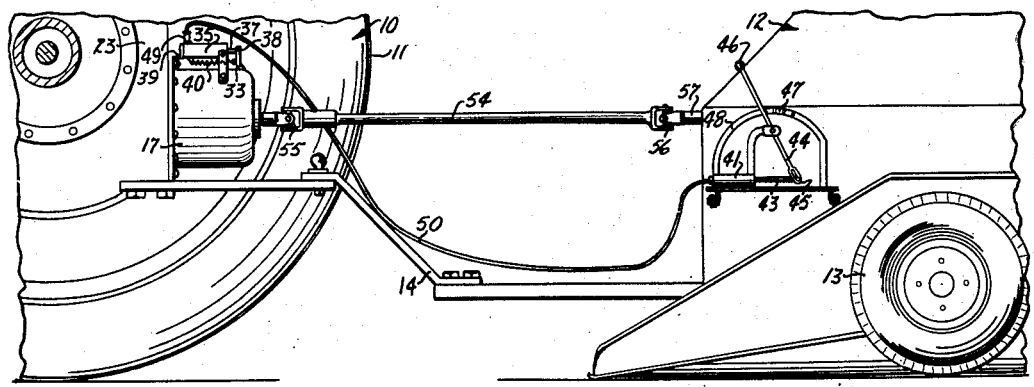
INVENTOR.
Conway C. Harkleroad.
BY Victor J. Evans & Co.
ATTORNEYS United States Patent Office 2,883,866
Patented Apr. 28, 1959

2,883,866

POWER CONTROL MECHANISM

Conway C. Harkleroad, Batesville, Ark.

Application April 10, 1957, Serial No. 651,839

3 Claims. (Cl. 74—11)

This invention relates to a power control mechanism.

The object of the invention is to provide a power control mechanism which will permit a power take off shaft of a tractor or other member to be readily controlled from a remote location.

Another object of the invention is to provide a power control mechanism whereby a person can readily control the rotation of a shaft from a remote location so that for example, the power take off shaft from a tractor can be controlled whereby the operation of implements can be quickly or temporarily halted or stopped whenever required or desired.

A further object of the invention is to provide a power control mechanism which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary sectional view showing the present invention being used between a tractor and an implement behind the tractor.

Figure 2 is a fragmentary sectional view showing the present invention.

Figure 3 is a fragmentary sectional view showing the modification.

Figure 4 is a fragmentary sectional view illustrating another modification.

Referring in detail to the drawings, the numeral 10 designates a portion of a conventional tractor which includes the usual rear wheels 11, while in Figure 1 the numeral 12 indicates a portion of an implement which is being towed behind the tractor 10, the implement 12 including the usual wheel 13. There is further provided a hitch structure 14 whereby the implement 12 is towed behind and by the tractor 10.

Extending rearwardly from the body member of the tractor 10 is a first shaft 15 which is provided with a splined rear end 16, Figure 2. A housing 17 includes a flange 21 which is connected to the portion 23 of the tractor 10, by means of suitable securing elements such as bolts or screws 22. Arranged in the housing 17 is a partition 18 which defines in the housing a first compartment 19 and a second compartment 20.

There is further provided a bearing 24 which is supported in the partition 18, and a second shaft 25 extends through the bearing 25 and includes a sleeve 26 which is mounted on the splined portion 16 of the shaft 15. The front end of the shaft 25 is connected to a flywheel or disc 27 which forms part of a clutch 28. The clutch 28 includes a casing 29, and there is provided clutch members 30 which are mounted for movement into and out of frictional engagement with the disc 27. Links or levers 31 extend from the clutch members 30 to a collar 32, and an arm 33 is provided for moving the collar 32 so as to control actuation of the clutch 28. The arm 33 extends through a slot 34 in the housing 17.

There is further provided a first cylinder 35 which has a movable piston 36 mounted therein, and a rod 37 extends from the piston 36 and is pivotally connected to the outer end of the arm 33 through the medium of a pivot pin 38, the cylinder 35 being supported by a bracket 39. A coil spring 40 has one end connected to the arm 33, while the other end of the coil spring 40 may be anchored through the cylinder 35.

There is further provided a second cylinder 41 which is spaced from the first cylinder 35, and the cylinder 41 has a piston 42 movably mounted therein, there being a rod 43 extending from the piston 42. A control lever 44 is connected to the outer end of the rod 43 by means of a pivot pin 45, and a knob 46 is secured to the lever 44 so as to facilitate the manual shifting thereof. Teeth 47 on a rack 48 are provided for maintaining the lever 44 immobile in its various adjusting positions.

A conduit 50 extends from the cylinder 41 to the cylinder 35, and a fitting 49 is provided so that when the conduit 50 is to be disconnected from the cylinder 35, the fitting 49 can be disassembled. The cylinder 41 is mounted on the implement 12 which is being towed behind the tractor 10.

There is further provided a third shaft 51 which extends through the compartment 20 of the housing 17, and the third shaft 51 has a collar 52 thereon, the rear end of the shaft 51 being splined as a 53. A fourth shaft 54 is adapted to be connected to the shaft 51 through the medium of a coupling 55, while the other end of the shaft 54 can be connected to a shaft 57 by means of a coupling 56, and the shaft 57 can be used for operating any suitable mechanism on the implement 12.

Referring to Figure 3 of the drawings, there is shown a modification wherein the numeral 58 indicates a gear box which is adapted to be connected to the housing 17 in any suitable manner, as for example, by means of bolts 59. A shaft 60 includes a sleeve 61 which is connected to the splined portion 53 of the shaft 51, and mounted on an end of the shaft 60 is a beveled gear 62 which meshes with a bevel gear 63, the bevel gear 63 being mounted on a shaft 64, and a pulley 65 is connected to the shaft 64. An endless belt is adapted to be trained over the pulley 65 so that power can be supplied to any suitable locality.

Referring to Figure 4 of the drawings, there is shown a further modification wherein a pulley 66 includes a central socket 67 which can be mounted directly on the splined portion 53 of the shaft 51.

From the foregoing, it is apparent that there has been provided a power control mechanism which can be used for remotely controlling the operation of a shaft. As shown in Figures 1 and 2, the present invention is shown being used with a tractor 10 and an implement 12, and the implement 12 may be of any conventional construction. The numeral 15 indicates the usual power take off shaft which extends rearwardly from the tractor 10, and according to the present invention the implement 12 is pulled behind the tractor 10 by means of the hitch 14. The implement 12 which may be a corn picker, chopper, or any other conventional implement, is adapted to have its mechanism operated by means of the shaft 57, and when the implement 12 is being used, the shaft 57 is rotated by the shaft 54, and the shaft 54 is rotated by the shaft 51. The shaft 51 is rotated by the shaft 15 when the clutch 28 is in operative position. However, in the event that foreign matter or objects become lodged in the various parts of the implement 12, then rotation of the shaft 57 can be temporarily halted or stopped so that the corn chopper or other implement will stop operating whereby a person can safely remove the foreign objects without danger of becoming injured or hurt. In order to cause this stoppage of rotation of the shaft 57, the control lever 54 is manually shifted by gripping the knob 46 so as to cause the piston 42 to move in the cylinder 41. As the piston 42 moves, it builds up pressure in the cylinder 41 and a suitable medium such as hydraulic fluid can be arranged in the cylinder 41 whereby there will be a build up of pressure in the conduit 50 and this will build up pressure in the cylinder 35 to thereby cause movement of the piston 36 which is arranged in the cylinder 35. As the piston 36 moves, it causes movement of the arm 33 so as to actuate the clutch 28 whereby rotation of the shaft 51 can be controlled as desired. Since the shaft 54 is connected to the shaft 51 by means of a coupling 55, it will be seen that by controlling the operation of the clutch 28, rotation of the shafts 54 and 57 can be readily controlled whereby operation of the implement 12 can be regulated as desired. Thus, it is not necessary for the person to mount the tractor 10 in order to stop rotation of the shaft 57 since the rotation of the shaft 57 can be controlled from a remote location, as for example, in the vicinity of the implement 12.

While in Figures 1 and 2, the present invention has been illustrated being used for controlling operation of an implement which is arranged behind a tractor, it is to be understood that the present invention can be used for controlling rotation of other members. For example, as shown in Figure 3, by disconnecting the coupling 55 and shaft 54, a gear box 58 can be connected to the housing 17 by means of the bolts 59. Then, it will be seen that rotation of the shaft 51 will cause rotation of the shaft 60 and this in turn will cause rotation of the shaft 64 through the medium of the intermeshing bevel gears 62 and 63. As the shaft 64 rotates, it causes rotation of the pulley 65 and the pulley 65 may have a suitable belt trained thereover so that power can be supplied to any suitable locality.

In Figure 4 there is shown a further modified arrangement wherein by removing the coupling 55 and shaft 54, a pulley 66 can be directly mounted on the splined portion 53 of the shaft 51. Then, an endless belt can be trained over the pulley 66 so that power can be supplied for any suitable purpose.

Thus, it will be seen that there has been provided a hydraulic means for controlling operation of a clutch and the apparatus of the present invention can be used in connection with farm equipment or other apparatus which is dangerous to operate as when such an implement as the implement 12 receives its power from a tractor or other power unit such as a corn picker or snapper, hay baler, combine, sheller or the like. The clutch mechanism is adapted to be installed on the rear of the tractor power take off or installed in the shaft operating assembly. The clutch 28 is positioned in the compartment 20 of the housing 17, and the main clutch disc 27 operates from the power take off, and the clutch disc 30 is adapted to engage the main clutch disc 27 so as to operate the machinery. The hydraulic cylinder 35 is provided, and there is further provided the spring 40 for disengaging the clutch when pressure is not applied. The flexible line or conduit 50 connects the hydraulic cylinder 35 to the hydraulic cylinder 41 which is mounted on the implement or equipment being operated.

Many accidents have occurred in the past, as for example, when foreign matter becomes caught in a corn picker or snapper, the operator sometimes forgets or fails to stop the operation of the corn picker or snapper and the operator starts cleaning the machine with the power in force. Then, when the machine starts to operate, as the machine is being cleaned, accidents happen and, for example, arms or hands can be seriously injured or mutilated. By means of the present invention the implement can be thrown out of gear when cleaning operations are being performed so that such accidents will not occur. By having the control lever 44 convenient to the implement 12, the implement can be stopped or started as needed.

As shown in Figures 3 and 4, a pulley such as the pulley 65 or pulley 66 can be used instead of the shaft and such pulleys can be used for supplying power to sawmills whereby the operator can readily stop the mill in case of an accident or for any other reason. The teeth or notches 47 hold pressure on the clutch when in operation but the lever 44 can be disengaged when required. The clutch can also be used as an overload and safety clutch to prevent the breakage of equipment when overloading by adjusting the disc plates to slip at the desired tension when in use. A blind pulley can be installed on the back of the clutch instead of using the universal joint to operate the equipment, as when an endless belt is required. The member 48 acts as a guide for the lever 44, and by moving the lever 44, pressure is exerted in the cylinder 41 to operate the clutch. The spring 40 will disengage the clutch when the pressure is released. The control lever 44 is pivoted as at 68 so that sufficient leverage can be attained. The fitting 49 permits the conduit 50 to be unhooked when the implement 12 is detached from the tractor 10.

I claim:

1. In combination, a body member, a first shaft extending from said body member and adapted to be connected to a power source, a housing including a flange secured to said body member, a partition arranged in said housing and defining therein a first and second compartment, a bearing supported in said partition, a second shaft extending through said bearing and including a sleeve positioned in said first compartment and connected to an end of said first shaft, a clutch positioned in said second compartment and connected to said second shaft, there being a slot in said housing, an arm projecting through said slot for controlling actuation of said clutch, a third shaft extending through said second compartment and connected to said clutch, and the outer end of said third shaft being provided with a splined portion, a first cylinder connected to said housing, a piston movably mounted in said cylinder, a rod extending from said piston and connected to said arm, a coil spring having one end connected to said arm and its other end anchored to said cylinder, a second cylinder spaced from said first cylinder, a piston movably mounted in said second cylinder, a conduit connecting said first and second cylinders together, a rod connected to the piston in said second cylinder, a lever connected to said last named rod, a fourth shaft arranged in end to end relation with respect to said third shaft, a coupling connecting said fourth and third shafts together, and means for connecting said fourth shaft to the operating mechanism of an implement.

2. In combination, a body member, a first shaft extending rearwardly from said body member and adapted to be connected to a power source, said first shaft including a splined portion, a housing including a flange secured to said body member, a partition arranged in said housing and defining therein a first and second compartment, a bearing supported in said partition, a second shaft extending through said bearing and including a sleeve positioned in said first compartment and connected to the splined portion of said first shaft, a clutch positioned in said second compartment and connected to said second shaft, there being a slot in said housing, an arm projecting through said slot for controlling actuation of said clutch, a third shaft extending through said second compartment and connected to said clutch, and the outer end of said third shaft being provided with a splined portion, a first cylinder connected to said housing, a piston movably mounted in said cylinder, a rod extending from said piston and pivotally connected to the outer end of said arm, a coil spring having one end connected to said arm and its other end anchored to said cylinder, a second cylinder spaced from said first cylinder, a piston movably mounted in said second cylinder, a conduit connecting said first and second cylinders together, a rod connected to the piston in said second cylinder, a lever connected to said last named rod, a knob secured to the lever for facilitating the manual shifting thereof, a gear box connected to said housing, a fourth shaft arranged in said gear box and connected to the splined portion of said third shaft, a fifth shaft arranged at right angles to said fourth shaft, beveled gear means connecting said fourth and fifth shafts together, and a pulley connected to said fifth shaft.

3. In combination, a body member, a first shaft extending from said body member and adapted to be connected to a power source, a housing including a flange secured to said member, a partition arranged in said housing and defining therein a first and second compartment, a bearing supported in said partition, a second shaft extending through said bearing and including a sleeve positioned in said first compartment and connected to an end of said first shaft, a clutch positioned in said second compartment and connected to said second shaft, there being a slot in said housing, an arm projecting through said slot for controlling actuation of said clutch, a third shaft extending through said second compartment and connected to said clutch, and the outer end of said third shaft being provided with a splined portion, a first cylinder connected to said housing, a piston movably mounted in said cylinder, a rod extending from said piston and connected to said arm, a coil spring having one end connected to said arm and its other end anchored to said cylinder, a second cylinder spaced from said first cylinder, a piston movably mounted in said second cylinder, a conduit connecting said first and second cylinders together, a rod connected to the piston in said second cylinder, and a lever connected to the last named rod, and a pulley having its central portion mounted on the splined portion of said third shaft.

References Cited in the file of this patent

UNITED STATES PATENTS

| | | |
|---|---|---|
| 1,131,401 | MacPherson | Mar. 9, 1915 |
| 1,390,920 | Nagy | Sept. 13, 1921 |
| 1,465,815 | Goldner | Aug. 21, 1923 |
| 1,861,108 | Brace | May 31, 1932 |
| 2,075,579 | Hansen | Mar. 30, 1937 |
| 2,141,678 | Andres | Dec. 27, 1938 |